United States Patent
Yen et al.

(10) Patent No.: US 7,486,128 B2
(45) Date of Patent: *Feb. 3, 2009

(54) CHARGE PUMP CONTROL CIRCUIT AND CONTROL METHOD THEREOF

(75) Inventors: Chih-Jen Yen, Hsinchu (TW); Chih-Yuan Hsieh, Chiayi (TW)

(73) Assignee: Novatek Microelectronics Corp., Hsinchu (TW)

( * ) Notice: Subject to any disclaimer, the term of this patent is extended or adjusted under 35 U.S.C. 154(b) by 85 days.

This patent is subject to a terminal disclaimer.

(21) Appl. No.: 11/457,818

(22) Filed: Jul. 17, 2006

(65) Prior Publication Data

US 2007/0018700 A1    Jan. 25, 2007

(30) Foreign Application Priority Data

Jul. 21, 2005    (TW) .............................. 94124654 A

(51) Int. Cl.
*G05F 1/575* (2006.01)

(52) U.S. Cl. ...................... 327/536; 327/540; 363/59

(58) Field of Classification Search ............... None
See application file for complete search history.

(56) References Cited

U.S. PATENT DOCUMENTS

| 5,227,675 A | * | 7/1993 | Taguchi | 327/530 |
| 5,426,334 A | * | 6/1995 | Skovmand | 327/427 |
| 6,566,847 B1 | * | 5/2003 | Chou et al. | 323/282 |
| 6,756,838 B1 | * | 6/2004 | Wu et al. | 327/536 |
| 6,980,047 B1 | * | 12/2005 | Kuo | 327/537 |
| 2006/0197583 A1 | * | 9/2006 | Yen et al. | 327/536 |

* cited by examiner

*Primary Examiner*—Lincoln Donovan
*Assistant Examiner*—Terry L Englund
(74) *Attorney, Agent, or Firm*—Jianq Chyun IP Office

(57) ABSTRACT

A charge pump control circuit and a control method for controlling charge pumps are disclosed. The output terminal of the charge pump is coupled to a load circuit. The charge pump control circuit includes a detecting and controlling circuit and a controlled oscillator. The detecting and controlling circuit is used to detect the load status of the load circuit and output a control signal according to the load status. The controlled oscillator receives the control signal and outputs at least one clock signal. According to the control signal to control a frequency of the clock signal, the charge pump control circuit controls the charge pump.

14 Claims, 5 Drawing Sheets

CHARGE PUMP CONTROL CIRCUIT AND CONTROL METHOD THEREOF

CROSS-REFERENCE TO RELATED APPLICATION

This application claims the priority benefit of Taiwan application serial no. 94124654, filed on Jul. 21, 2005. All disclosure of the Taiwan application is incorporated herein by reference.

BACKGROUND OF THE INVENTION

1. Field of Invention

The present invention relates to a charge pump. More particularly, the present invention relates to a circuit and a method for improving the efficiency of charge pump circuits and the charge pumps which use the circuit and the method.

2. Description of Related Art

Generally, a traditional charge pump circuit includes a voltage source, one or more charge capacitance, a load capacitance, a number of circuit switches and a fixed-frequency clock used to control a number of circuit switches. Using a clock period as an example (e.g. a doubled two phases circuit), in the first half period, circuit switches are used to make a parallel connection between a voltage source and a charge capacitance so as to charge the charge capacitance to a voltage level; in the second half period, circuit switches are used to make a serial connection between the voltage source and the charge capacitance and a load capacitance. After a number of periods are repeated, the voltage difference between two sides of the load capacitance will be lifted up to a voltage level that is much higher than that of the original voltage source.

FIG. 1A illustrates a traditional charge pump which is controlled by the fixed input frequency clock Ø1 and clock Ø2. FIG. 1B illustrates the equivalent circuits of the traditional circuit shown in FIG. 1A when the clock Ø1 and the clock Ø2 are in high voltage. Referring to FIG. 1B, when clock ψ1 turns the switches SW1 and SW4 on, the input voltage Vi charges the capacitance C1 to the level of voltage source Vi. Here assuming the electric charge stored on the capacitance C2 is zero, when the clock Ø2 turns the switches SW2 and SW3 on, the electric charge stored on the capacitance C1 will be redistributed between the capacitance C1 and the capacitance C2 which is connected with the capacitance C1 in parallel. After repeating the period a number of times, the voltage difference between two sides of the capacitance C2 can be lifted up to twice as much as the input voltage level, viz. 2Vi.

The voltage required for such circuit design can be achieved by using different progressions of the charge pumps in accordance with the needed voltage levels. However, as the consumption of electric charge stored on the load capacitance by the load circuit, the voltage stored on the load capacitance will be reduced along with the consumption of the load. In order to maintain the voltage stored on the load capacitance, after the load capacitance reaches the target voltage level, it is necessary that the switches of the charge pump continuously charge the load capacitance with a fixed frequency. Therefore, the capacitance C1 has to obtain electric charge from the voltage source Vi at a fixed period and supplies the electric charge to the capacitance C2 so as to maintain the voltage of the capacitance C2. This mechanism results in the phenomenon of ripple that the output voltage level of the charge pump has the same clock frequency with the input of the charge pump. The size of the ripple is in inverse ratio to the load capacitance, in direct ratio to the load power consumption and in inverse ratio to the input frequency of the charge pump circuit.

FIG. 2 illustrates the ripple oscillogram produced by the traditional charge pump under the operation of different clock frequencies. As shown in FIG. 2, at the moment of discharging clock Ø1 and charging clock Ø2 will cause the output voltage to occur a ripple whose size is related to the frequency of the supplementary electric charge of the charge pump circuit and the size of the load current. To a fixed current load, the input clock frequency f1 is slower than the input clock frequency f2; accordingly, the discharge time of the first circuit 210 is longer than that of the second circuit 220 so that the amplitude of the ripple of the first circuit 210, Vripple1, is bigger than that of the second circuit 220, Vripple2.

When the load current of the load circuit driven by the charge pump changes along with time, the choices of the needed input clock frequency and the needed load capacitance are usually determined by the biggest load, so as to meet the lowest demand for the ripple size. When the demand of the load is low, if the input clock frequency is the fixed high input frequency, there will be unnecessary power consumption and the efficiency of the charge pump will be reduced. If a relative low frequency is used as the input clock frequency, too big ripple amplitude will be occurred, resulting in an increase of interference to the load circuit. When a relative big capacitance is used, it will lead to a waste of the area cost and an increase of the load of the voltage source.

SUMMARY OF THE INVENTION

Accordingly, the present invention is directed to provide a charge pump control circuit to improve the efficiency of the charge pump and reduce the ripple size.

Another object of the present invention is to provide a charge pump control method to determine the charge pump input frequency along with the load driven by the charge pump.

The present invention provides a charge pump control circuit. The output terminal of the charge pump is coupled to the load circuit. The charge pump control circuit comprises a detecting and controlling circuit and a controlled oscillator. The detecting and controlling circuit is used to detect the load status of the load circuit and output a control signal according to the status of the load. The controlled oscillator receives the control signal and outputs at least one clock signal. According to the control signal to control at least one frequency of the clock signal, the charge pump control circuit controls the charge pump.

According to the charge pump control circuit of the preferred embodiment of the present invention, the aforementioned control signal is either a current signal or a voltage signal, and the detected signal can be either a current signal or a voltage signal, or both of them.

The present invention provides a charge pump control method. The output terminal of the charge pump is coupled to the load circuit. The method includes at least the following steps. First, the load status of the load circuit is detected, and a control signal according to the status of the load is outputted. Then, according to the control signal, at least one frequency of the clock signal is controlled, and the output voltage of the charge pump is controlled by at least one clock signal.

According to the charge pump control method of the preferred embodiment of the present invention, the load status of the aforementioned load circuit is obtained by detecting the output voltage of the charge pump. In addition, the control signal is either a voltage signal or a current signal. At least one clock signal is produced by using a voltage-controlled oscillator or a current-controlled oscillator to receive the signal.

According to the charge pump control method of the preferred embodiment of the present invention, the load status of the aforementioned load circuit is obtained by detecting the current of an internal specified circuit of the load circuit; the control signal is either a voltage signal or a current signal. At least one clock signal is produced by using a voltage-controlled oscillator or a current-controlled oscillator to receive the signal.

The present invention adopts the structure of the feedback control charge pump and the clock frequency of the charge pump is determined according to the load driven by the charge pump, so that the efficiency of the charge pump can be improved and the ripple size can be reduced.

In order to make the aforementioned and other objects, features and advantages of the present invention comprehensible, a preferred embodiment accompanied with figures is described in detail below.

DESCRIPTION OF PREFERRED EMBODIEMNT

Figure 3:
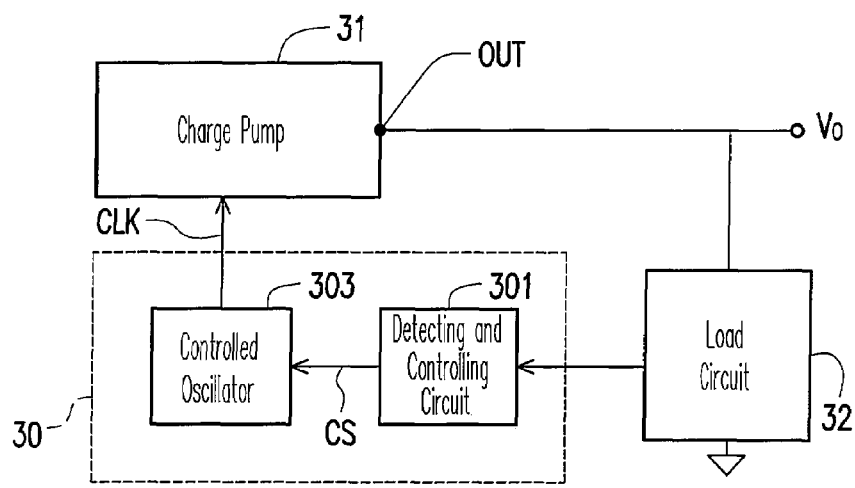
FIG. 3 is a block diagram illustrating a charge pump control circuit according to the preferred embodiment of the present invention.

FIG. 3 is a block diagram illustrating a charge pump control circuit according to the preferred embodiment of the present invention. Referring to FIG. 3, the charge pump control circuit 30 is used to control the charge pump 31. The output terminal OUT of the charge pump 31 is coupled to the load circuit 32. The charge pump control circuit comprises a detecting and controlling circuit 301 and a controlled oscillator 303. The detecting and controlling circuit 301 is used to detect the load status of the load circuit 32 and output a control signal CS according with the status. The controlled oscillator 303 receives the control signal CS and outputs at least one clock signal CLK. According to the control signal CS to control the frequency of the clock signal CLK, the charge pump control circuit controls the charge pump 31.

Figure 1A:
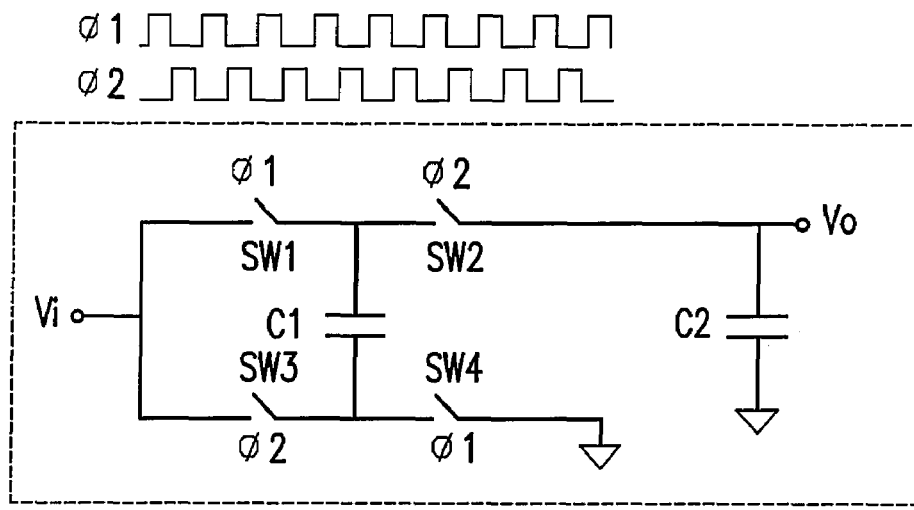
FIG. 1A illustrates a circuit diagram of the traditional charge pump.
Figure 1B:
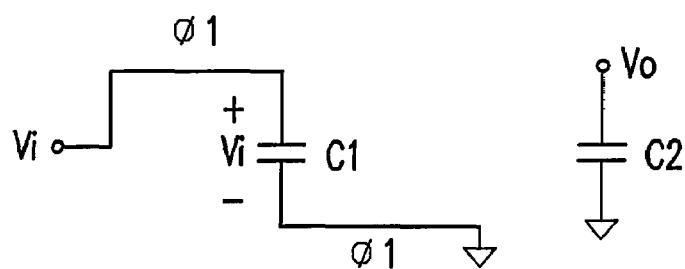
FIG. 1B illustrates the equivalent circuits of the traditional circuit shown in FIG. 1A when the clock Ø1 and the clock Ø2 are in high voltage.
Figure 1B:
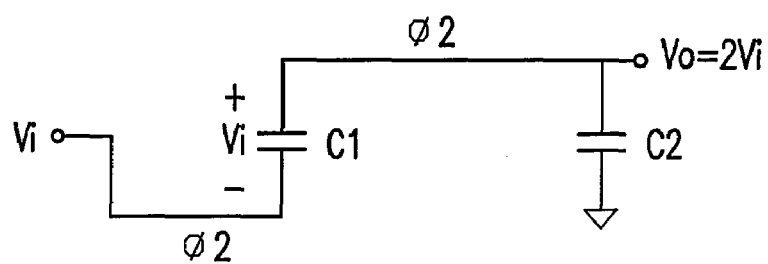
Figure 2:
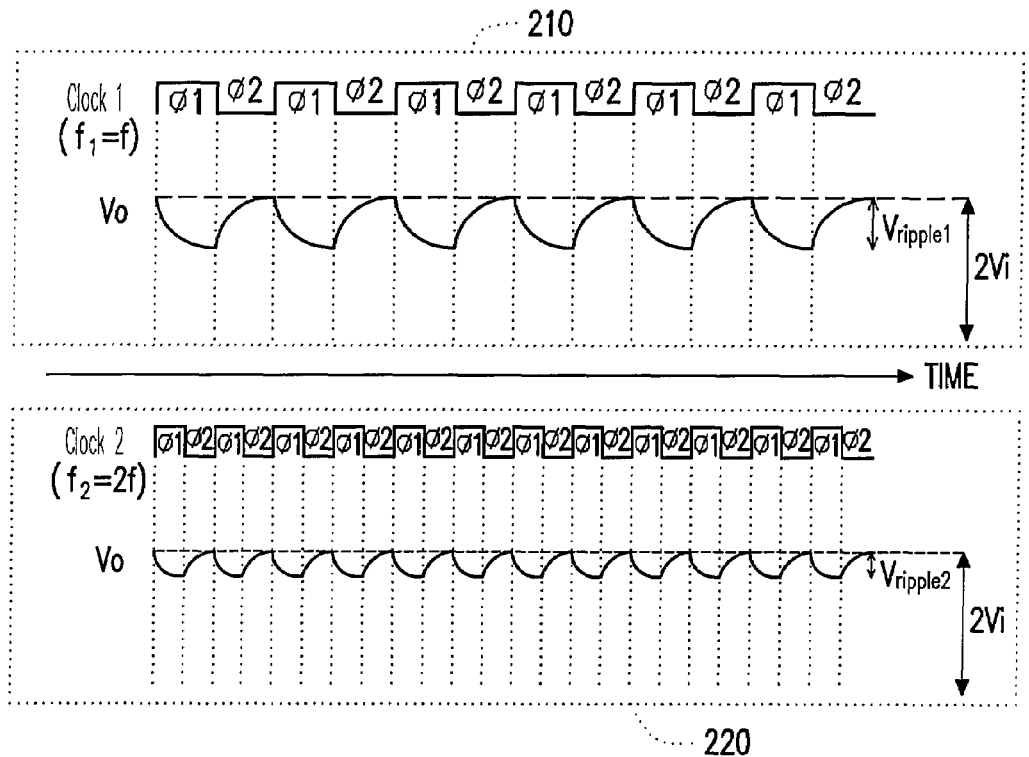
FIG. 2 illustrates the ripple oscillogram produced by the traditional charge pump under the operation of different clock frequencies.

Wherein, the charge pump 31 can be any type of charge pumps. For example, the charge pump 31 uses the traditional charge pump in FIG. 1, which provides voltage through four switches, two inversion clock signals and two capacitances. However, when the load current of the load circuit 32 changes along with time, for example, the load current flowing through the load circuit 32 is getting greater, the charge pump 31 needs a faster frequency to stabilize voltage. Here, the charge pump control circuit of the preferred embodiment of the present invention can be used to control these two inversion clock signals to lift up the frequencies of the two inversion clock signals. Because of the increase of the frequencies of the two inversion clock signals, the charge pump 31 can have the output voltage with a smaller ripple.

In another situation, for example, the load current flowing through the load circuit 32 is getting smaller, the ripple of the output voltage of the charge pump 31 is getting smaller, too. Here, the charge pump control circuit of the preferred embodiment of the present invention can be used to control these two inversion clock signals to reduce the frequencies of the two inversion clock signals. Because of the de crease of the frequencies of the two inversion clock signals, the dynamic power consumption, e.g., when switching, can be reduced, and the efficiency of the charge pump can be improved.

Figure 4:
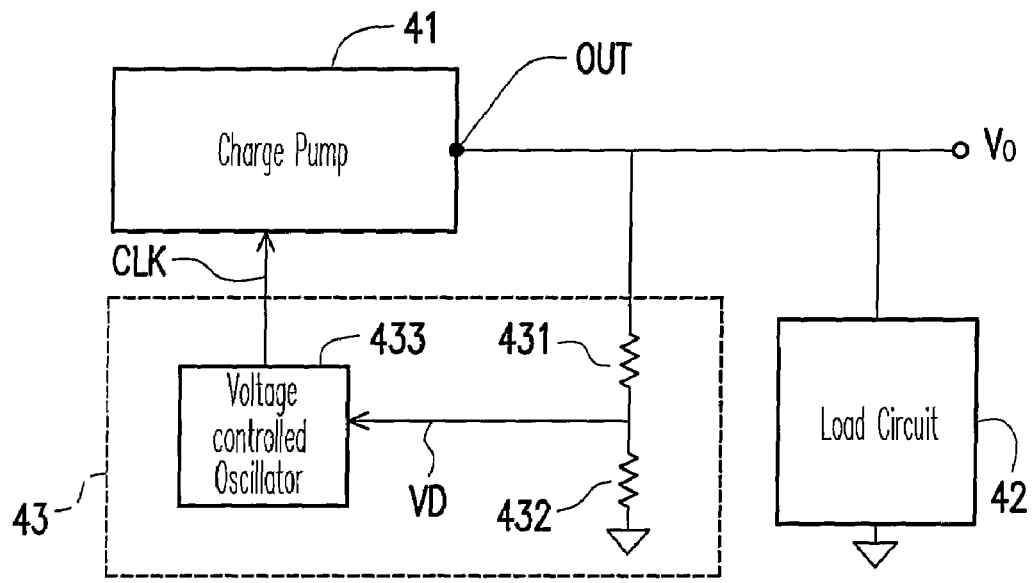
FIG. 4 is one of the detailed implementing circuits of the charge pump control circuit according to the preferred embodiment of the present invention.

FIG. 4 is one of the detailed implementing circuits of the charge pump control circuit according to the aforementioned preferred embodiment of the p resent invention. Referring to FIG. 4, the circuit diagram includes a charge pump 41 controlled by the circuit, a load circuit 42 and the charge pump control circuit 43 which includes a first resistance 431, a second resistance 432 and a voltage-controlled oscillator (VCO) 433. Wherein, the first resistance 431 and the second resistance 432 are corresponding with the detecting and controlling circuit 301 in FIG. 3. The VCO 433 is corresponding with the controlled oscillator 303 in FIG. 3. Wherein, the VCO 433 is controlled by the detecting and controlling circuit 301.

In the embodiment of the circuit, the load status of the load circuit 42 is detected by, e.g., detecting the output voltage of the output terminal OUT of the charge pump. For example, when the load current needed by the load circuit 42 is relatively great, the output voltage of the output terminal OUT of the charge pump 41 will consequently drop down. Here, the charge pump 41 needs faster frequency to supply the electric charge from the loss. An end of the first resistance 431 is coupled to the output terminal OUT of the charge pump 41. An end of the second resistance 432 is coupled to the other end of the first resistance 431. The other end of the second resistance is coupled to the first voltage (e.g. grounding). After the two resistances have divided the voltage of the output terminal OUT of the charge pump, the other end of the first resistance outputs the divided voltage signal VD as the control signal to control the VCO 433 so as to increase the frequency of the output clock CLK. Thus, the charge pump 41 can use the clock signal with a higher frequency to control switches so as to supply electric charge more quickly.

Contrarily, for example, when the load current of the load circuit 42 is relatively small, the output voltage of the output terminal OUT of the charge pump 41 will be more stable. Accordingly, the charge pump 41 will not need to supply electric charge quickly. Because of the high clock frequency, the power consumption of the charge pump 41, e.g. the dynamic power consumption when switching, will increase, resulting in a decrease of charge pump efficiency. Therefore, when the output voltage ripple of the output terminal OUT of the charge pump 41 is relatively small, the first resistance 431 and the second resistance 432 will increase the divided voltage of the charge pump output terminal OUT. Accordingly, as a control signal, the divided voltage signal VD outputted by the other end of the first resistance 431 will control the VCO 433 and make the frequency of the output clock CLK decline. Consequently, the unnecessary power consumption, e.g. the dynamic power consumption, can be decreased.

Figure 5:
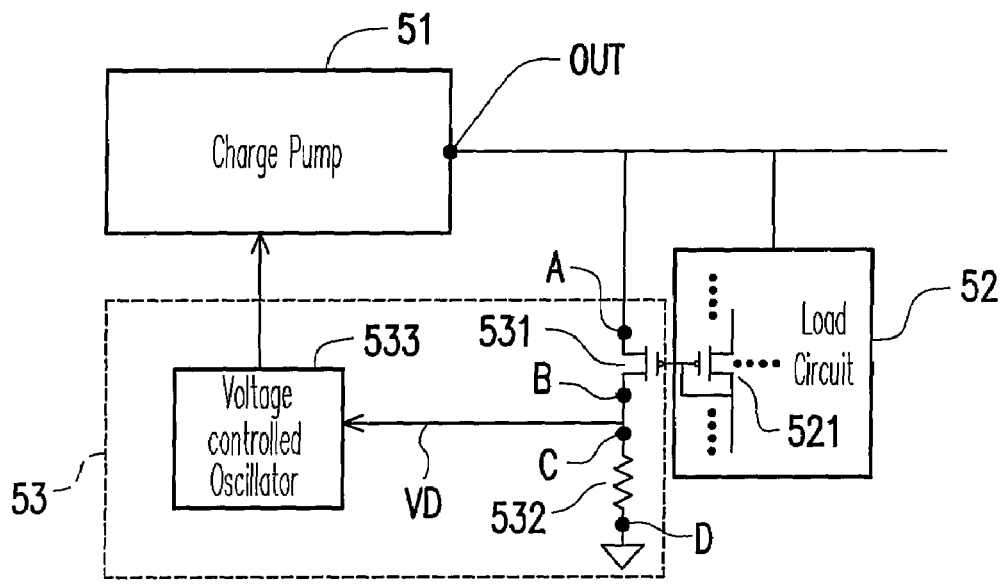
FIG. 5 is one of the detailed implementing circuits of the charge pump control circuit according to the preferred embodiment of the present invention.

Similarly, the embodiment in FIG. 3 can be implemented in the way of FIG. 5. FIG. 5 is one of the detailed implementing circuits of the charge pump control circuit according to the aforementioned preferred embodiment of the present invention. Referring to FIG. 5, the circuit diagram includes a charge pump 51 controlled by the circuit, a load circuit 52 and the charge pump control circuit 53 which includes a dependent current source 531, a resistance 532 and a voltage-controlled oscillator (VCO) 533. Wherein, the resistance 532 and the dependent current source 531 are corresponding with the detecting and controlling circuit 301 in FIG. 3. The VCO 533 is corresponding with the controlled oscillator 303.

In the circuit, the first terminal A of the dependent current source is coupled to the output terminal OUT of the charge pump 51. The internal specified circuit 521 is taken as the load status, and the dependent current I is outputted according to the specified circuit 521. The first end C of the resistance is coupled to the second terminal B of the dependent current source, and the second end D of the resistance is coupled to the first voltage (e.g. grounding in the embodiment), wherein the first end C of the resistance outputs the voltage signal VD as the control signal.

The dependent current source 531 of the present embodiment uses, for example, the internal specified circuit 521 of the load circuit 52 to couple with a transistor as a current mirror. The current mirror is regarded as the dependent current source 531, and the current flowing through the specified circuit 521 is regarded as the load status. Though the following embodiments all take the aforementioned current mirror as an example, it is to be understood that the embodiments of the present invention should not be limited to this.

First, when the load current that the load circuit 52 needs is relatively great, the current of the current mirror in the internal specified circuit 521 of the load circuit shown in FIG. 5 will increase. The increase of the current of the internal specified circuit 521 results in a corresponding increase of the dependent current I flowing out of the dependent current source 531. The current I flows through the resistance 532 which causes a voltage drop at the first end C of the resistance. The increase of the dependent current I means a greater need for the load current. Here, the voltage signal VD received by the VCO 533 goes up, which causes the frequency of the clock signal CLK to rise; consequently, the charge pump 51 can control switches with a higher frequency clock signal CLK to supply electric charge more quickly so as to achieve the purpose of depressing the ripple.

Contrarily, for example, when the load current that the load circuit 52 needs is relatively small, the current of the specified circuit 521 is getting smaller, which correspondingly causes the dependent current I flowing out the dependent current source 531 to be smaller, the voltage drop that the current I produces at the first end C of the resistance to decrease, and the voltage signal VD to drop. The lowering of the voltage signal VD received by the VCO 533 results in a decline of the frequency of the clock signal CLK. Consequently, the unnecessary power consumption, e.g. the dynamic power consumption, can be decreased.

Figure 6:
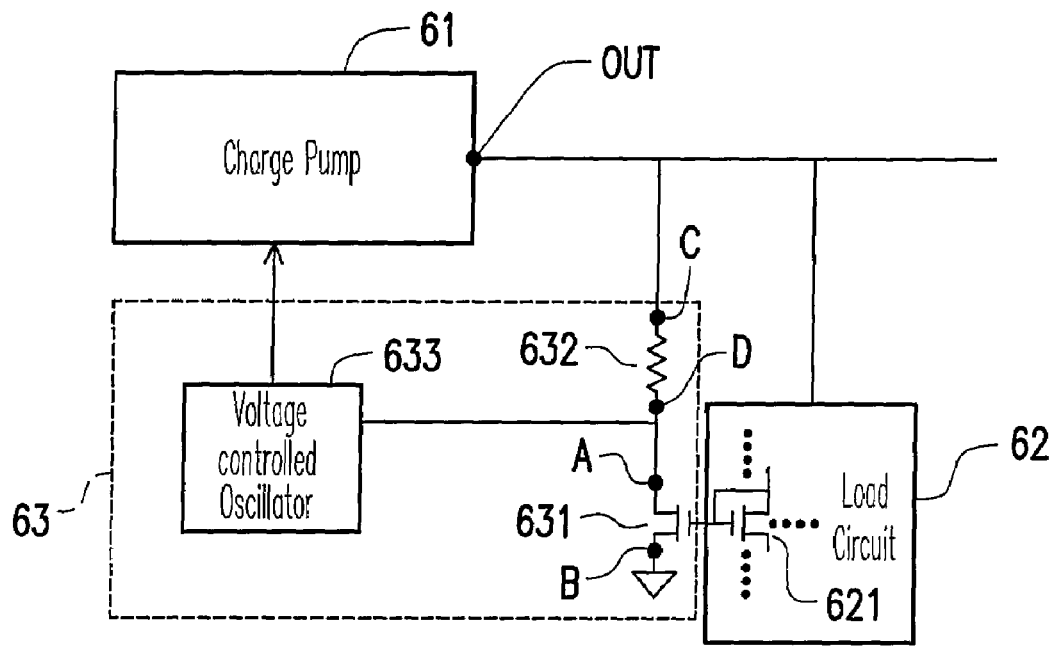
FIG. 6 is one of the detailed implementing circuits of the charge pump control circuit according to the preferred embodiment of the present invention.

FIG. 6 is one of the detailed implementing circuits of the charge pump control circuit according to the aforementioned preferred embodiment of the present invention. The circuit diagram includes a charge pump 61 controlled by the circuit, a load circuit 62 and the charge pump control circuit 63 which includes a dependent current source 631, a resistance 632 and a voltage-controlled oscillator (VCO) 633. Wherein, the resistance 632 and the dependent current source 631 are corresponding with the detecting and controlling circuit 301 in FIG. 3. The VCO 633 is corresponding with the controlled oscillator 303.

In the circuit, the first end C of the resistance 632 is coupled to the output terminal OUT of the charge pump 61, the second end D of the resistance 632 outputs a voltage signal as the control signal. The first terminal A of the dependent current source 631 is coupled to the second end D of the resistance 632, the second terminal B of the dependent current source 631 is coupled to the first voltage (e.g. the grounding in the embodiment). The internal specified circuit 621 of the load circuit 62 is taken as the load status detection, and the dependent current I is outputted according to the specified circuit. Likewise, the circuit and the method of FIG. 6 are similar with those of FIG. 5. The difference between them is that the locations of the dependent current source 631 and the resistance 632 are exchanged. The controlling method of the circuit is the same as that of FIG. 5, so the description is omitted.

Figure 7:
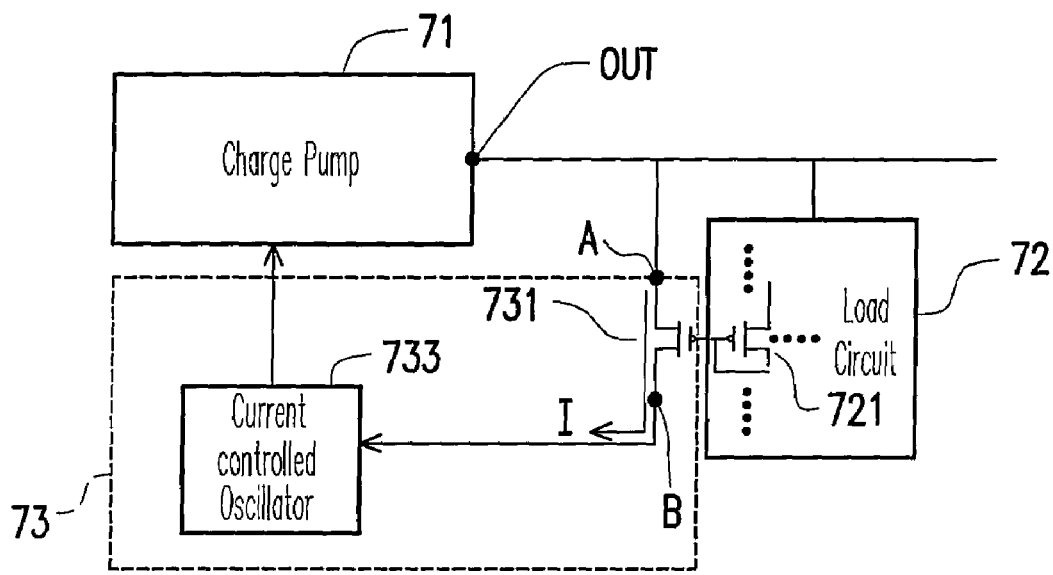
FIG. 7 is one of the detailed implementing circuits of the charge pump control circuit according to the preferred embodiment of the present invention.

FIG. 7 is also one of the detailed implementing circuits of the charge pump control circuit according to the aforementioned preferred embodiment of the present invention. The circuit diagram includes a charge pump 71 controlled by the circuit, a load circuit 72 and the charge pump control circuit 73 which includes a dependent current source 731 and a current-controlled oscillator (CCO) 733. Wherein, the dependent current source 731 is corresponding with the detecting and controlling circuit 301 in FIG. 3. Besides, the CCO 733 is corresponding with the controlled oscillator 303.

In the embodiment, the dependent current source 731 includes the first terminal A and the second terminal B. The first terminal A of the dependent current source 731 is coupled to a pre-established terminal which is e.g. the output terminal of the charge pump 71 (it is to be understood that the embodiment is not to be taken in a limiting sense). The second terminal B of the dependent current source 731 is coupled to the CCO 733. The internal specified circuit 731 of the load circuit 72 is regarded as the load status detection, and the dependent current I (the current signal) as the control signal is outputted according to the specified circuit.

First, when the load current that the load circuit 72 needs is relatively great, the current of the current mirror in the internal specified circuit 721 of the load circuit shown in FIG. 7 will increase. The increase of the current of the specified circuit 721 results in the corresponding increase of the dependent current I flowing out of the dependent current source 731. The increase of the dependent current I means a greater need for the load current. Here, the current signal I received by the CCO 733 goes up, which causes the frequency of the clock signal CLK to rise; consequently, the charge pump 71 can control switches with a higher frequency clock signal CLK to supply electric charge more quickly so as to achieve the purpose of depressing the ripple.

Contrarily, for example, when the load current that the load circuit 72 needs is relatively small, the current of the specified circuit 721 is getting smaller, which correspondingly causes the dependent current I flowing out the dependent current source 731 to be smaller. Accordingly, the drop of the current signal I received by the CCO 733 results in a decline of the frequency of the clock signal CLK. Consequently, the unnecessary power consumption, e.g. the dynamic power consumption, can be decreased.

Figure 8:
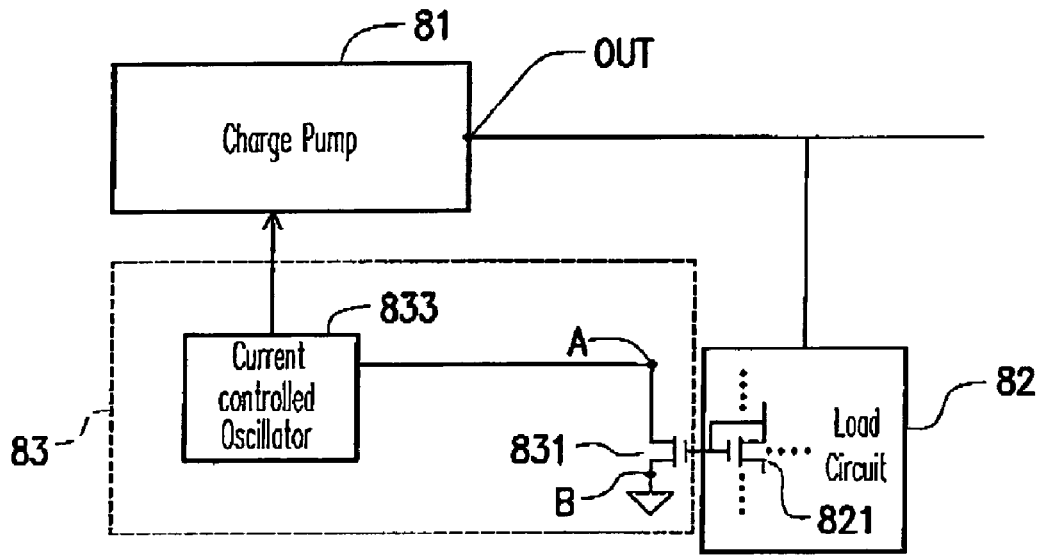
FIG. 8 is one of the detailed implementing circuits of the charge pump control circuit according to the preferred embodiment of the present invention.

FIG. 8 is also one of the detailed implementing circuits of the charge pump control circuit according to the aforementioned preferred embodiment of the present invention. The circuit diagram includes a charge pump 81 controlled by the circuit, a load circuit 82 and the charge pump control circuit 83 which includes a dependent current source 831 and a current-controlled oscillator (CCO) 833. Wherein, the dependent current source 831 is corresponding with the detecting and controlling circuit 301 in FIG. 3. Besides, the CCO 833 is corresponding with the controlled oscillator 303 in FIG. 3.

In the circuit, the dependent current source 831 includes the first terminal A and the second terminal B. The first terminal A of the dependent current source 831 is coupled to the CCO 833. The second terminal B of the dependent current source 831 is coupled to the first voltage (e.g. the grounding in the embodiment). The internal specified circuit 831 of the load circuit 82 is regarded as the load status detection, and the dependent current I (the current signal) as the control signal is outputted according to the specified circuit 821. Likewise, the circuit and the method in FIG. 8 are similar with those in FIG. 7. The difference between them is the distinctive coupling way of the dependent current sources 831 and 731. The controlling method of the circuit is same as that in FIG. 7, so the detail is omitted.

Figure 9:
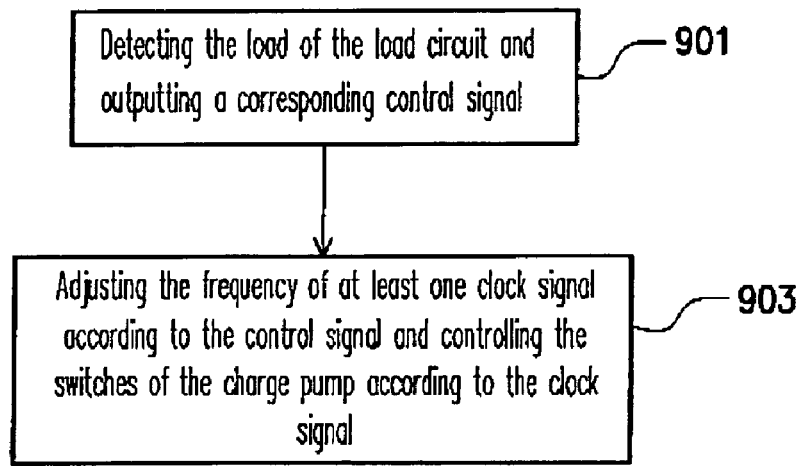
FIG. 9 is the schematic flow chart of the charge pump control method according to the preferred embodiment of the present invention.

According to the aforementioned embodiment, the present invention provides a charge pump control method to control charge pumps; its flow chart is shown in FIG. 9. The method includes at least the following steps: first, detecting the load status of the load circuit and outputting the corresponding control signal according to the load status (Step 901); adjusting at least one clock signal frequency according to the control signal and controlling the switches of the charge pump according to the clock signal (Step 903).

Wherein, the load status of the load circuit can be obtained by detecting the output voltage of the charge pump, for example, the illustration of FIG. 4. In the embodiment of FIG. 4, the control signal is the voltage signal VD, and at least one clock signal CLK is produced by using a voltage-controlled oscillator to receive the voltage signal VD.

Possibly, as the circuits shown in FIG. 5, FIG. 6, FIG. 7 and FIG. 8, the load status of the load circuit is determined by the current of the internal specified circuit of the load circuit. In addition, another way such as FIG. 7 and FIG. 8, the control signal is the current signal I which is at least one clock signal produced by using a current-controlled oscillator, e.g. the current-controlled oscillator 733 in FIG. 7, to receive the current signal.

In summary, the present invention adopts the structure of the feedback control charge pump, and the clock frequency of the charge pump is determined according to the load driven by the charge pump, so that the efficiency of the charge pump can be improved.

The present invention is disclosed above with its preferred embodiments. It is to be understood that the preferred embodiment of present invention is not L to be taken in a limiting sense. It will be apparent to those skilled in the art that various modifications and variations can be made to the structure of the present invention without departing from the scope or spirit of the invention. The protection scope of the present invention is in accordance with the scope of the following claims and their equivalents.

What is claimed is:

1. A charge pump control circuit for controlling a charge pump, and an output terminal of the charge pump being coupled to a load circuit, the charge pump control circuit comprising:
    a detecting and controlling circuit for detecting a load status of the load circuit and generating and outputting a control signal according to only the detection result, wherein the detecting and controlling circuit comprises a dependent current source coupled to the load circuit for generating a corresponding dependent current according to a current of an internal specified circuit of the load circuit in order to obtain the load status of the load circuit; and
    a controlled oscillator for receiving the control signal, controlling a frequency of at least one clock signal according to the control signal and outputting the at least one clock signal to the charge pump.

2. The charge pump control circuit as claimed in claim 1, wherein the control signal is a voltage signal and the controlled oscillator is a voltage-controlled oscillator (VCO).

3. The charge pump control circuit as claimed in claim 1, wherein the control signal is a voltage signal, the voltage signal is changed into a current signal through a voltage-to-current circuit, and the controlled oscillator is a current-controlled oscillator (CCO) and controlled according to the current signal.

4. The charge pump control circuit as claimed in claim 1, wherein the control signal is a current signal and the controlled oscillator is a current-controlled oscillator (CCO).

5. The charge pump control circuit as claimed in claim 1, wherein the control signal is a current signal, the current signal is changed into a voltage signal through a current-to-voltage circuit, and the controlled oscillator is a voltage-controlled oscillator (VCO) and controlled according to the voltage signal.

6. The charge pump control circuit as claimed in claim 1, wherein the detecting and controlling circuit further comprises:
    a resistance component having a first end coupled to the dependent current source for receiving the dependent current and a second end coupled to a first voltage, wherein, the first end of the resistance component outputs the control signal.

7. The charge pump control circuit as claimed in claim 6, wherein a first terminal of the dependent current source is coupled to the output terminal of the charge pump, and a second terminal of the dependent current source outputs the dependent current.

8. The charge pump control circuit as claimed in claim 1, wherein the detecting and controlling circuit further comprises:
    a resistance component having a first end coupled to the output terminal of the charge pump and a second end outputting the control signal, wherein
    the dependent current source includes a first terminal and a second terminal, the first terminal of the dependent current source is coupled to the second end of the resistance component, and the second terminal of the dependent current source is coupled to a first voltage.

9. The charge pump control circuit as claimed in claim 1, wherein the
    dependent current source includes a first terminal and a second terminal, the first terminal of the dependent current source is coupled to the output terminal of the charge pump, and the second terminal of the dependent current source is coupled to the controlled oscillator, so as to output the dependent current as the control signal.

10. The charge pump control circuit as claimed in claim 1, wherein the dependent current source includes a first terminal and a second terminal, the first terminal of the dependent current source is coupled to the controlled oscillator, and the second terminal of the dependent current source is coupled to a first voltage, so as to output the dependent current as the control signal.

11. The charge pump control circuit as claimed in claim 1, wherein the dependent current source outputs the dependent current as the control signal.

12. A charge pump control method for controlling a charge pump having an output terminal coupled to a load circuit, comprising:

detecting a load status of the load circuit by generating a corresponding dependent current according to a current of an internal specified circuit of the load circuit, and generating and outputting a corresponding control signal according to only the detection result; and adjusting a frequency of at least one clock signal according to the control signal, and controlling switches of the charge pump according to the at least one clock signal.

13. The charge pump control method as claimed in claim 12, wherein the control signal is a voltage signal, the at least one clock signal is produced by using a voltage-controlled oscillator (VCO) to receive the voltage signal, or by changing the control signal into a current signal through a voltage-to-current circuit, then controlling a current-controlled oscillator (CCO).

14. The charge pump control method as claimed in claim 12, wherein the control signal is a current signal, and the at least one clock signal is produced by using a current-controlled oscillator (CCO) according to the current signal, or by changing the current signal into a voltage signal through a current-to-voltage circuit, then controlling a voltage-controlled oscillator (VCO).

* * * * *